United States Patent
Cho et al.

(10) Patent No.: US 7,151,739 B2
(45) Date of Patent: Dec. 19, 2006

(54) DIELECTRIC RECORDING/REPRODUCING HEAD AND DIELECTRIC RECORDING/REPRODUCING APPARATUS

(75) Inventors: Yasuo Cho, 4-5-304, Komegafukuro 2-chome, Aoba-ku, Sendai-shi, Miyagi (JP); Atsushi Onoe, Saitama (JP)

(73) Assignees: Yasuo Cho, Miyagi (JP); Pioneer Corporation, Tokyo (JP)

( * ) Notice: Subject to any disclaimer, the term of this patent is extended or adjusted under 35 U.S.C. 154(b) by 491 days.

(21) Appl. No.: 10/722,540

(22) Filed: Nov. 28, 2003

(65) Prior Publication Data

US 2004/0105380 A1    Jun. 3, 2004

(30) Foreign Application Priority Data

Nov. 28, 2002    (JP)    ............................. 2002-346109

(51) Int. Cl.
*G11B 9/00*    (2006.01)
(52) U.S. Cl. .................................................. 369/126
(58) Field of Classification Search ................ 365/151; 369/120, 13.01
See application file for complete search history.

(56) References Cited

U.S. PATENT DOCUMENTS 6,418,091 B1 * 7/2002 Hirokane et al. ........ 369/13.55
6,841,220 B1 * 1/2005 Onoe et al. ................ 428/66.7
2003/0053400 A1 * 3/2003 Cho et al. .................... 369/126
2003/0169672 A1 * 9/2003 Onoe et al. .................. 369/126
2004/0027935 A1 * 2/2004 Cho et al. ...................... 369/43
2004/0042351 A1 * 3/2004 Onoe et al. .............. 369/13.01
2004/0047245 A1 * 3/2004 Onoe et al. .............. 369/13.01
2004/0090903 A1 * 5/2004 Cho et al. .................... 369/126

OTHER PUBLICATIONS

Odagawa et al, "Measuring ferroelectric polarization component parallel to the surface by scanning nonlinear dielectric microscopy", Applied Physics Letters, vol. 80, No. 12, Mar. 25, 2002.

* cited by examiner

*Primary Examiner*—William Korzuch
*Assistant Examiner*—Adam R. Giesy
(74) *Attorney, Agent, or Firm*—Nixon & Vanderhye P.C.

(57) ABSTRACT

A dielectric recording/reproducing head is provided with: a probe; a return electrode for returning a high-frequency component of an electric field applied from the probe; and bias electrodes, which are placed under the return electrode. By applying a voltage stronger than a coercive electric field between the probe and each of the bias electrodes, polarization domains are formed which have polarization directions parallel to a surface of a dielectric recording medium. The polarization directions are determined by selecting the bias electrode to which the voltage is applied, and four types of data are recorded on a predetermined site of the dielectric recording medium, which allows multivalued recording. Moreover, the polarization directions of the polarization domains are detected by an electric field which is formed by applying a voltage between the bias electrodes and which is parallel to the surface of the dielectric recording medium, causing data to be read out.

16 Claims, 8 Drawing Sheets

DIELECTRIC RECORDING/REPRODUCING HEAD AND DIELECTRIC RECORDING/REPRODUCING APPARATUS

BACKGROUND OF THE INVENTION

1. Field of the Invention

The present invention relates to a dielectric recording/reproducing head, a dielectric recording apparatus, a dielectric reproducing apparatus, and a dielectric recording/reproducing apparatus for recording information with multivalued data in microdomains of a dielectric substance or for reproducing it.

2. Description of the Related Art

As high-density, large-capacity recording/reproducing apparatuses of randomly accessible type, there are known an optical disk apparatus and a hard disk drive (HDD) apparatus. Moreover, a recording/reproducing technique using a scanning nonlinear dielectric microscopy (SNDM) for nanoscale analysis of a dielectric (ferroelectric) substance has been recently proposed by the inventors of the present invention.

Optical recording uses an optical pickup with a laser as a light source. Data is recorded by forming pits that are concavo-convex on a disk surface or by forming the crystal phase in a phase shift medium. The data is reproduced by using the difference in the reflectance between an amorphous phase and a crystal phase or by using magneto optical effect. However, the pickup is relatively large, which is inappropriate for high-speed reading. Also, the size of the recording pit is defined by the diffraction limit of light, so that its recording density is limited to 50 G bit/inch$^2$.

In the longitudinal recording of magnetic recording as represented by the HDD, a magnetic resistance (MR) head has been recently realized by using giant magnetic resistance (GMR). Its recording density is expected to be larger than that of the optical disk by using perpendicular magnetic recording. However, the recording density is limited to 1 T bit/inch$^2$ because of thermal fluctuation of magnetic recording information and the presence of a Bloch wall in a portion in which a code is reversed, even if patterned media are used in view of the above cause.

The SNDM can distinguish the plus or minus of a ferroelectric domain by measuring a non-linear dielectric constant in a ferroelectric material. Moreover, it is known that the SNDM has sub-nanometer resolution with an electrically conductive cantilever having a small probe on its tip, which is used for atomic force microscopy (AFM) or the like.

In the recording/reproducing apparatus using the current SNDM technique, a head is provided with: a probe; an inductor connected with the probe; an oscillator which is also connected with the probe; and a return electrode for returning a high-frequency electric field which is applied from the tip of the probe and then passed through a ferroelectric recording medium. A resonance circuit is formed from a capacitance of the ferroelectric recording medium just under the probe and from the inductor. Data reproduction is performed by detecting changes in oscillation frequency in polarization states in the vertical direction of the surface of the ferroelectric recording medium. Moreover, data recording is performed by applying an electric field from the probe to the ferroelectric recording medium in the vertical direction of the surface of the ferroelectric recording medium and by forming the polarization states corresponding to the data in the vertical direction of the surface of the ferroelectric recording medium. Namely, information recorded in the ferroelectric material is binary data, which is either "0" or "1", and the information is recorded in the ferroelectric recording medium as polarization directions in the vertical direction of the surface of the ferroelectric recording medium.

SUMMARY OF THE INVENTION

It is therefore an object of the present invention to provide a dielectric recording/reproducing head, a dielectric recording apparatus, a dielectric reproducing apparatus, or a dielectric recording/reproducing apparatus, capable of multivalued or multilevel recording by forming polarization domains having polarization directions parallel to a surface of a dielectric recording medium in order to increase its recording capacity, with respect to data recording or data reproduction using the SNDM method.

The above object of the present invention can be achieved by a dielectric reproducing head for reproducing data recorded in a dielectric recording medium, provided with: a probe for applying a high-frequency signal to the dielectric recording medium to detect a nonlinear dielectric constant of a part of the dielectric recording medium located under the probe; a plurality of bias electrodes placed around the probe, for forming an electric field parallel to a surface of the dielectric recording medium; and a return electrode for returning the high-frequency signal.

The dielectric reproducing head of the present invention is a device for reproducing data recorded in the dielectric recording medium as polarization directions parallel to the surface of the dielectric recording medium. In the dielectric reproducing head, the probe is placed such that the probe or a needle of the probe extends in the perpendicular direction with respect to the surface of the dielectric recording medium and the tip of the probe (needle) touches the surface of the dielectric recording medium or faces it with a small space. The bias electrodes are placed around the probe. Each bias electrode faces the surface of the dielectric recording medium with a small space. The respective bias electrodes are arranged substantially parallel to the surface of the dielectric recording medium. The return electrode is placed near the probe. The return electrode faces the surface of the dielectric recording medium with a small space.

By applying a voltage between two of the bias electrodes arranged substantially parallel to the surface of the dielectric recording medium, the electric field parallel to the surface of the dielectric recording medium is formed in the dielectric recording medium. It is preferable that this voltage is an alternative current voltage having about 5 to 8 kHz in frequency, for example. In this condition, the high-frequency signal is applied to the dielectric recording medium through the probe. It is preferable that the high-frequency signal has about 1 GHz in frequency, for example. The high-frequency signal flows in the dielectric recording medium, and then flows to the return electrode. By using this high-frequency signal, a nonlinear dielectric constant of a part of the dielectric recording medium located under the probe can be detected.

The nonlinear dielectric constant of the ferroelectric (dielectric) substance is changed depending on the polarization direction of the ferroelectric substance. Therefore, the polarization direction of the ferroelectric substance can be detected by detecting the nonlinear dielectric constant of the ferroelectric substance. The detection of the nonlinear dielectric constant of the ferroelectric substance can be achieved by using a scanning nonlinear dielectric microscopy (SNDM).

According to the SNDM, in order to detect the nonlinear dielectric constant of the ferroelectric substance, firstly, the relatively low frequency electric field (about 5 to 8 kHz, for example) is formed in the ferroelectric substance. By the formation of this electric field, a capacitance of the ferroelectric substance is changed according to the nonlinear dielectric constant of the ferroelectric substance. The change of the capacitance of the ferroelectric substance is picked up with the probe. The picking up the change of the capacitance can be achieved, for example, by using a resonance circuit constructed by a probe, a ferroelectric substance, a return electrode, an inductor and other electric elements needed for oscillation. In this circuit, an oscillation signal is applied from the probe to the return electrode through the ferroelectric substance. The frequency of the oscillation signal, i.e., the resonance frequency of the resonance circuit (an average of about 1 GHz, for example) is determined by the capacitance of the ferroelectric substance and an inductance of the inductor. If the capacitance of the ferroelectric substance is changed, the frequency of the oscillation signal is changed. Therefore, the change of the capacitance of the ferroelectric substance can be picked up on the basis of the oscillation signal. On the basis of the change of the capacitance of the ferroelectric substance, the nonlinear dielectric constant of the ferroelectric substance can be recognized.

In the dielectric reproducing head of the present invention, the SNDM method may be used. By using the SNDM, a nonlinear dielectric constant of a part of the dielectric recording medium located under the probe can be preferably detected on the basis of the high-frequency signal. On the basis of the nonlinear dielectric constant of the dielectric recording medium, the polarization direction of the dielectric recording medium can be recognized. As the data is recorded in the dielectric recording medium as polarization directions, the data can be read out from the dielectric recording medium.

The data is recorded in the dielectric recording medium as polarization directions parallel to the surface of the dielectric recording medium. For example, four kinds of data units "00", "01", "10" and "11" can be recorded by assigning these data units to four polarization directions, respectively. These polarization directions are parallel to the surface of the dielectric recording medium, but these are different in one plane parallel to the surface. It is assumed that the data unit "00" is recorded in the dielectric recording medium as a polarization direction X parallel to the surface. In this condition, the electric field parallel to the surface is formed with the bias electrodes. If the direction of the electric field coincides with the polarization direction X, the change of the capacitance of the dielectric recording medium is at a maximum. On the other hand, if the direction of the electric field is perpendicular to the polarization direction X, the change of the capacitance of the dielectric recording medium is at a minimum. Thus, the angular relationship between the direction of the applied electric field and the polarization direction corresponding to any one of the data units can be recognized by detecting the change of the capacitance of the dielectric recording medium (i.e., by the detection of the nonlinear dielectric constant).

According to the dielectric reproducing head of the present invention, it is possible to reproduce more than two kinds of data (for example, "00", "01", "10", "11") from one polarization domain of the dielectric recording medium. Consequently, multivalued recording or multivalued reproduction can be achieved.

In one aspect of the dielectric reproducing head associated with the present invention, the plurality of bias electrodes make a plurality of bias electrode pairs, two bias electrodes in each of the bias electrode pairs are placed on both sides of the probe respectively, and the probe and the two bias electrodes in each of the bias electrode pairs are arranged in a straight line.

According this aspect, when a voltage applied between the two bias electrodes, an electric field parallel to the surface of the dielectric recording medium is formed in a straight line, and the tip of the probe is located on the line. This means that the electric field is formed just under the tip of the probe. Therefore, the nonlinear dielectric constant of the dielectric recording medium located under the probe can be accurately detected.

In another aspect of the dielectric reproducing head associated with the present invention, four of the plurality of bias electrodes are placed around the probe at intervals of an angle of 90 degrees.

According to this aspect, two bias electrode pairs are arranged around the probe, and the two bias electrode pairs are placed such that they intersect at right angles. Namely, one of the two bias electrode pairs is arranged in an X direction parallel to the surface of the dielectric recording medium. Another one of the two bias electrode pairs is arranged in a direction parallel to the surface and perpendicular to the X direction. When the data recorded in the dielectric recording medium is read out, any one of the two bias electrode pairs is selected, and a voltage is applied between two bias electrodes of the selected bias electrode pairs. Therefore, electric fields can be formed in two directions parallel to the surface of the dielectric recording medium. Furthermore, if the polarity of the voltage applied between the bias electrodes of one of the bias electrode pairs is reversed, the direction of the electric field can be reversed. Thus, according to this aspect of the present invention, electric fields can be formed in four directions parallel to the surface of the dielectric recording medium. This is convenient for detection of polarization directions parallel to the surface of the dielectric recording medium.

In another aspect of the dielectric reproducing head associated with the present invention, an alternating current voltage generation device may be added to the dielectric reproducing head. The alternating current voltage generation device is a device for generating a plurality of alternating current voltages each having different phase from the others, and applying the plurality of alternating current voltages to the plurality of bias electrode pairs respectively.

According to this aspect, the alternating current voltages each having different phase are applied to the bias electrode pairs, respectively. By the applications of these voltages, electric fields parallel to the surface of the dielectric recording medium are formed in the dielectric recording medium. In the plane parallel to the surface, the electric fields are different in phase and in direction. By using the electric fields, a polarization direction parallel to the surface can be detected.

For example, two alternating current voltages which are different in phase from each other by 90 degrees are applied, respectively, to two of bias electric pairs which intersect each other at right angles. By the applications of these voltages, a rotating electric field is formed in the dielectric recording medium. Namely, by the applications of these voltages, the electric field rotates in the plane parallel to the surface of the dielectric recording medium around the point corresponding to the location of the tip of the probe. According to this, a polarization direction parallel to the surface can be accurately and easily detected.

The above object of the present invention can be achieved by a dielectric recording head for recording data in a dielectric recording medium, provided with: a probe; and a plurality of bias electrodes placed around the probe, for forming an electric field parallel to a surface of the dielectric recording medium by generating a voltage corresponding to the data between any one of the plurality of bias electrode and the probe.

The dielectric recording head of the present invention is a device for recording data in dielectric recording medium as polarization directions parallel to the surface of the dielectric recording medium. In the dielectric reproducing head, the probe is placed such that the probe or a needle of the probe extends in the perpendicular direction with respect to the surface of the dielectric recording medium and the tip of the probe (needle) touches the surface of the dielectric recording medium or faces it with a small space. The bias electrodes are placed around the probe. Each bias electrode faces the surface of the dielectric recording medium with a small space. The respective bias electrodes are arranged substantially parallel to the surface of the dielectric recording medium.

When data is recorded in the dielectric recording medium, a voltage is applied between the probe and any one of the bias electrodes. By the application of the voltage, an electric field parallel to the surface of the dielectric recording medium is formed in the dielectric recording medium. The voltage to be applied is relatively strong. Therefore, the amplitude of the electric field form by the application of the voltage is stronger than the amplitude of a coercive electric field of the dielectric recording medium. Consequently, a polarization direction is set such that it coincides with the direction of the electric field. The direction of the electric field is determined by the selection of the bias electrode to which the voltage is to be applied. Therefore, the polarization direction can be set by the selection of the bias electrode. If the bias electrode to which the voltage is to be applied is selected according to the data to be recorded (for example, "00", "01", "10", "11" etc.), the polarization direction can be set according to the data. Thus, the data can be recorded in the dielectric recording medium as polarization directions parallel to the surface of the dielectric recording medium. If two or more bias electrodes are placed around the probe, more than two kinds of data units can be recorded in one polarization domain by selection of the bias electrodes and selection of a polarity of the voltage applied between the probe and the selected bias electrode. Consequently, multivalued recording can be achieved.

In one aspect of the dielectric recording head associated with the present invention, the plurality of bias electrodes make a plurality of bias electrode pairs, two bias electrodes in each of the bias electrode pairs are placed on both sides of the probe respectively, and the probe and the two bias electrodes in each of the bias electrode pairs are arranged in a straight line.

According to this aspect, a polarization direction can be set regularly according to the regular arrangement of the bias electrodes.

In another aspect of the dielectric recording head associated with the present invention, four of the plurality of bias electrodes are placed around the probe at intervals of an angle of 90 degrees.

According to this aspect, four kinds of polarization directions can be set according to data units to be recorded. Therefore, four kinds of data units can be recorded in one polarization domain.

The above object of the present invention can be achieved by a dielectric reproducing apparatus for reproducing data recorded in a dielectric recording medium, provided with: a dielectric reproducing head comprising (i) a probe for applying a high-frequency signal to the dielectric recording medium to detect a nonlinear dielectric constant of a part of the dielectric recording medium located under the probe, (ii) a plurality of bias electrodes placed around the probe, for forming an electric field parallel to a surface of the dielectric recording medium, and (iii) a return electrode for returning the high-frequency signal; an alternating current signal generating device for generating an alternating current signal to be applied to the plurality of bias electrodes of the dielectric reproducing head to form the electric field; an oscillating device for generating the high-frequency signal to be applied to the probe; a demodulating device for demodulating the high-frequency signal including a signal component corresponding to the nonlinear dielectric constant detected by the probe; and a data reproducing device for reproducing the data on the basis of the demodulated high-frequency signal and the alternating current signal.

According to this apparatus, data recorded in the dielectric recording medium as polarization directions parallel to the surface of the dielectric recording medium can be reproduced. In order to reproduce the data, firstly, the alternating current signal generating device generates the alternating current signal. The alternating current signal is applied to between two bias electrodes among the plurality of bias electrodes in the dielectric reproducing head. By the application of this signal, the electric field parallel to the surface of the dielectric recording medium is formed in the dielectric recording medium. Next, the oscillating device generates the high-frequency signal. The high-frequency signal is applied between the probe and the return electrode. By the application of the high-frequency, the high-frequency signal flows from the probe into the dielectric recording medium and then flows to the return electrode. Thus, the signal component corresponding to the nonlinear dielectric constant of the dielectric recording medium located under the probe can be detected with the probe. Namely, as mentioned above, the change of the capacitance corresponding to the nonlinear dielectric constant of the dielectric recording medium appears the change of the frequency of the high-frequency signal (i.e., a change of a resonance frequency of a resonance circuit including the oscillation device, the probe, the dielectric recording medium, the return electrode and other elements necessary for the oscillation). That is to say, the signal component corresponding to the nonlinear dielectric constant of the dielectric recording medium is included in the high-frequency signal. Next, the demodulating device demodulates the high-frequency signal including the signal component corresponding to the nonlinear dielectric constant. Next, the data reproducing device reproduces the data on the basis of the demodulated high-frequency signal and the alternating current signal.

The data reproducing device may use coherent detection in order to reproduce the data from the high-frequency signal. In this case, the alternating current signal is used for the coherent detection. Since the change of the capacitance of the dielectric recording medium is caused by the application of the alternating current signal, the signal component corresponding to the nonlinear dielectric constant can be easily and accurately extracted on the basis of the phase and the frequency of the alternating current signal. As a device for performing coherent detection, a lock-in amplifier may be preferably used.

The above object of the present invention can be achieved by a dielectric recording apparatus for recording data in a dielectric recording medium, provided with: a dielectric recording head comprising (i) a probe and (ii) a plurality of bias electrodes placed around the probe, for forming an electric field corresponding to the data parallel to a surface of the dielectric recording medium; a recording signal generating device for generating a recording signal corresponding to the data; and a signal applying device for applying the recording signal between the probe and any one of the plurality of bias electrodes to form the electric field corresponding to the data.

According to the dielectric recording apparatus, the data can be recorded in the dielectric recording medium as polarization directions parallel to the surface of the dielectric recording medium. In order to record the data in the dielectric recording medium, firstly, the recording signal generating device generates the recording signal corresponding to the data to be recorded. Next, the signal applying device applies the recording signal between the probe and any one of the bias electrodes of the dielectric recording head. By the application of this signal, an electric field which is parallel to the surface of the dielectric recording medium and which is stronger than a coercive electric field of the dielectric recording medium is formed in the dielectric recording medium. Hence, the polarization direction is set according to a data unit.

The above object of the present invention can be achieved by a dielectric recording/reproducing apparatus for recording data in a dielectric recording medium and for reproducing data recorded in the dielectric recording medium, provided with: a dielectric recording/reproducing head comprising (i) a probe, (ii) a plurality of bias electrodes placed around probe, (iii) a return electrode placed near the probe; an oscillating device for generating a high-frequency signal to be applied between the probe and the return electrode, in order to detect a nonlinear dielectric constant of a part of the dielectric recording medium located under the probe through the probe; an alternating current signal generating device for generating an alternating current signal to be applied to the plurality of bias electrodes, in order to form an electric field in the dielectric recording medium; a demodulating device for demodulating the high-frequency signal including a signal component corresponding to the nonlinear dielectric constant of a part of the dielectric recording medium located under the probe; a data reproducing device for reproducing the data on the basis of the demodulated high-frequency signal and the alternating current signal; a recording signal generating device for generating a recording signal corresponding to the data to be recorded; and a signal applying device for applying the recording signal between the probe and any one of the plurality of bias electrodes.

According to this apparatus, the data can be recorded in the dielectric recording medium as polarization directions parallel to the surface of the dielectric recording medium, and the data recorded in the dielectric recording medium as polarization directions parallel to the surface of the dielectric recording medium can be reproduced. As mentioned above, since data is recorded as polarization direction parallel to the surface of the dielectric recording medium, and more than two polarization directions can be selected and set in the plane parallel to the surface, more than two kinds of data units can be recorded in one polarization domain. Hence, multivalued recording and multivalued reproduction can be achieved.

Incidentally, in the above-explained dielectric recording/reproducing head and dielectric recording/reproducing apparatus, as the shape of the probe for applying an electric field, a pin shape or needle-shape, a cantilever-shape, and the like are known as its specific structure. Electrodes having such a shape are collectively referred to as "the probe" in the specification as occasion demands.

Moreover, as the dielectric recording medium, e.g., lithium tantalite ($LiTaO_3$), PZT, or the like, which is a ferroelectric substance, is preferably used. Other dielectric recording media may be used.

Furthermore, the dielectric recording/reproducing head and dielectric recording/reproducing apparatus of the present invention use a method of recording information in the dielectric recording medium or of reproducing it on the basis of a scanning nonlinear dielectric microscopy (SNDM) method. The SNDM technique is introduced in detail by Yasuo Cho, one of the present inventors, in Oyo Butsuri, vol. 67, no. 3, p 327 (1998). Namely, it detects a polarization state of a dielectric (ferroelectric) substance by scanning on the dielectric (ferroelectric) substance with the probe, and it detects the capacitance corresponding to the polarization direction, which corresponds to recorded data. Moreover, data is recorded by applying an electric field from the probe to the dielectric (ferroelectric) substance and by forming polarization domains. It enables extremely high-density recording.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (Embodiment of Dielectric Reproducing/Reproducing Head)

Figure 1:
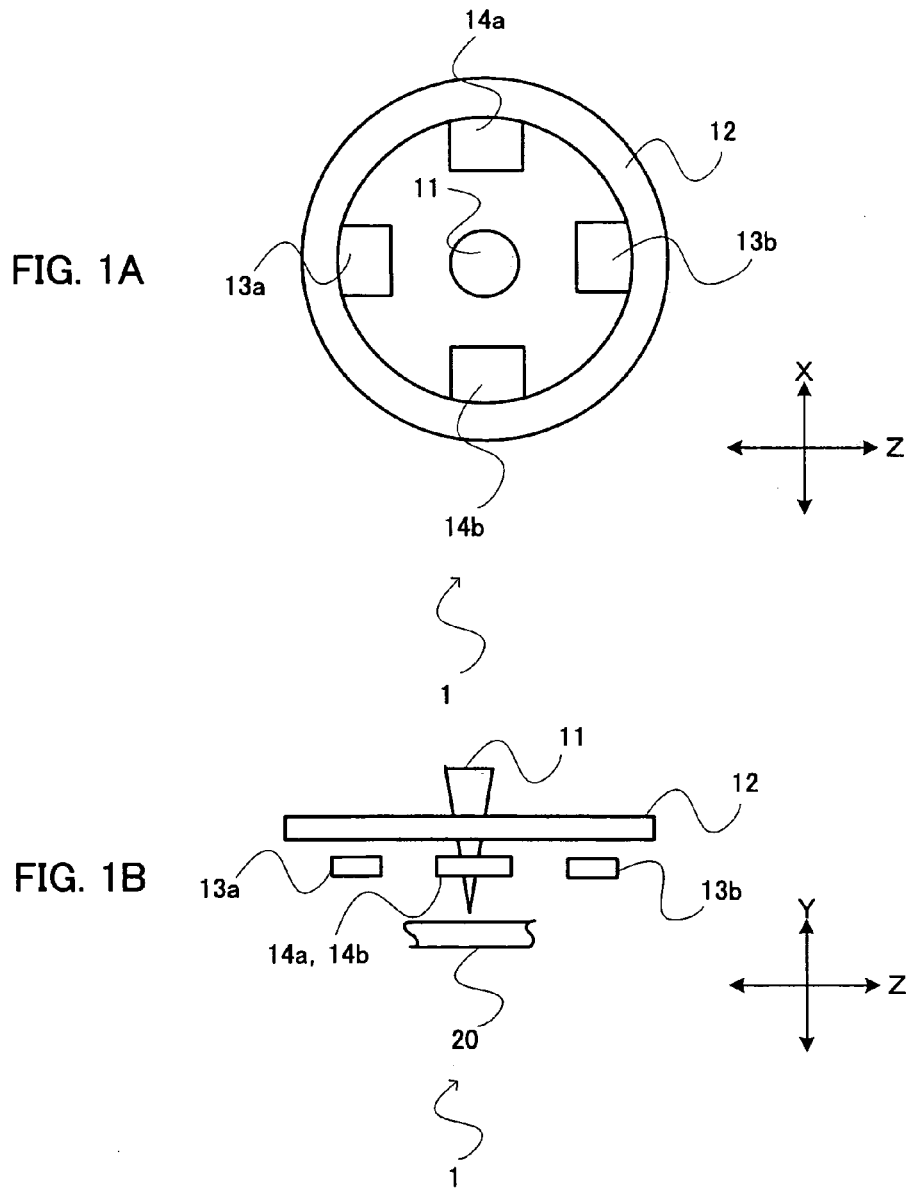
FIG. 1A and FIG. 1B are schematic diagrams showing an embodiment of a dielectric recording/reproducing head associated with the present invention.
Figure 2:
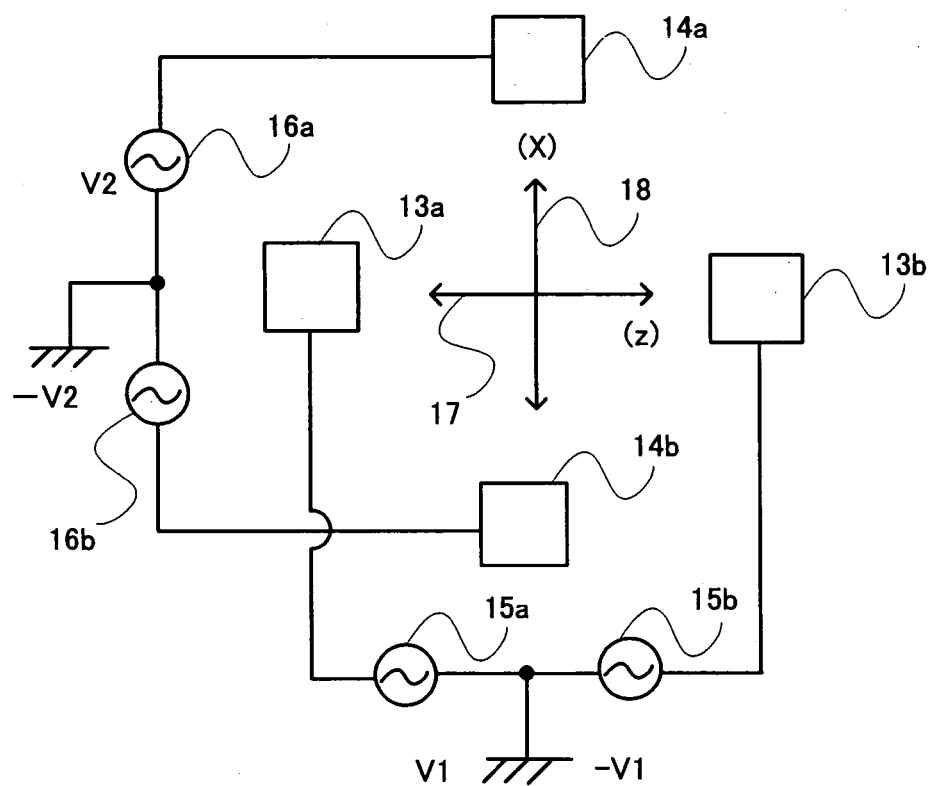
FIG. 2 is a schematic diagram showing a relationship between the placement of electrodes of the dielectric recording/reproducing head and application of voltages.
Figure 3:
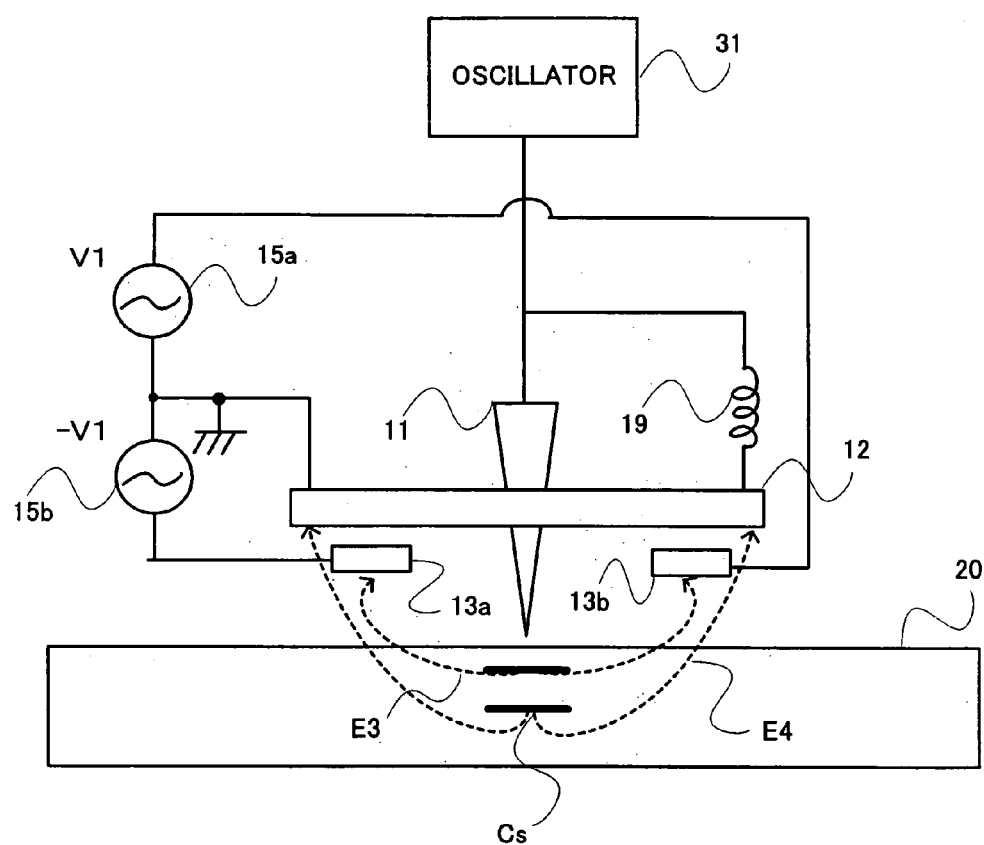
FIG. 3 is a schematic diagram showing an operation of the dielectric recording/reproducing head associated with the present invention.
Figure 4:
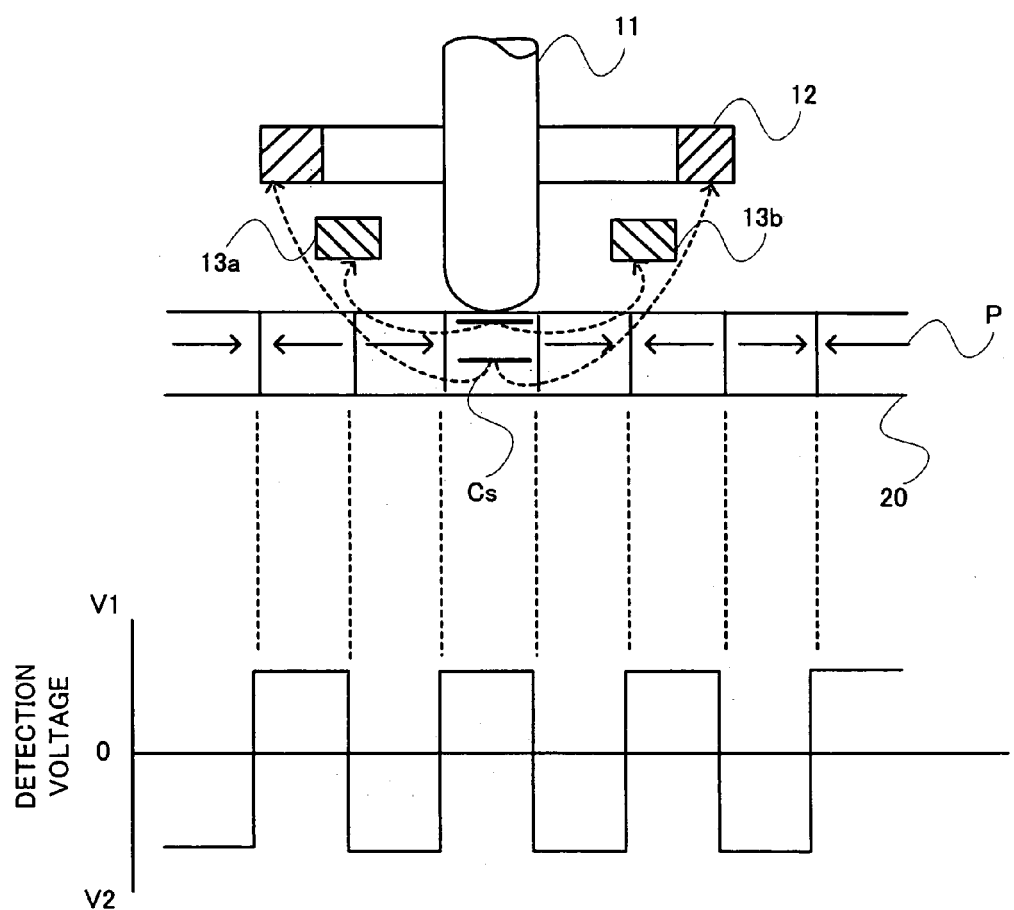
FIG. 4 is a schematic diagram to explain the recording/reproducing of information with respect to a ferroelectric substance.

An embodiment of a dielectric recording/reproducing head associated with the present invention will be explained with FIG. 1A to FIG. 4. FIG. 1A is a plan view showing the embodiment of the dielectric recording/reproducing head. FIG. 1B is a side view of the embodiment of the dielectric recording/reproducing head. FIG. 2 is a schematic diagram showing a relationship between the placement of electrodes of the dielectric recording/reproducing head and application of voltages. FIG. 3 is a schematic diagram showing an operation of the dielectric recording/reproducing head. FIG. 4 is a schematic diagram to explain the recording/reproducing of information with respect to a ferroelectric substance.

As shown in FIG. 1A and FIG. 1B, a dielectric recording/reproducing head 1 associated with the embodiment is provided with: a probe 11 whose tip faces a ferroelectric recording medium 20 for applying an electric field to the ferroelectric recording medium 20; a return electrode 12 for returning a high-frequency component of the electric field applied from the probe 11; and bias electrodes 13a, 13b, 14a, and 14b, which are placed under the return electrode 12.

The probe 11 is a conductive member, or an insulating member coated with a conductive film. The tip of the probe 11 facing the ferroelectric recording medium 20 is hemispherical and has a predetermined radius. This radius is an important factor in determining the radius of a polarization domain formed in the ferroelectric recording medium 20 correspondingly to record data, so it is extremely small, on the order of 10 nm. As the probe 11, a probe in a pin shape, needle-shape, a cantilever-shape or the like can be used. As the ferroelectric recording medium 20, a ferroelectric substance, such as $LiTaO_3$, PZT or the like may be preferably used.

The return electrode 12 is an lectrode for returning a high frequency electric field applied to the ferroelectric recording medium 20 from the probe 11, and it is placed to surround the probe 11. Incidentally, the shape and placement of the return electrode 12 can be set arbitrarily. However, it is preferable to design the shape and placement of the return electrode 12 such that the high frequency electric field can be returned to the return electrode 12 without resistance.

The bias electrodes 13a, 13b, 14a, and 14b are electrodes for applying an electric field having components parallel to the surface of the ferroelectric recording medium 20. The bias electrodes 13a and 13b form a pair with each other. The bias electrodes 13a and 13b are placed such that they face each other and the probe 11 is placed between them. Similarly, the bias electrodes 14a and 14b form a pair with each other. The bias electrodes 14a and 14b are placed such that they face each other and the probe 11 is placed between them. The direction of the arrangement of the bias electrodes 13a and 13b and the direction of the arrangement of the bias electrodes 14a and 14b intersect at right angles. Namely, each of the electrodes 13a, 13b, 14a and 14b is placed at every 90 degrees on a predetermined circumference with the probe 11 as the center. These bias electrodes 13a, 13b, 14a, 14b are placed about 1 mm above the surface of the ferroelectric recording medium 20, for example.

With respect to the bias electrodes 13a, 13b, 14a, and 14b placed as shown in FIG. 1, a voltage $V_1$ is applied to the bias electrode 13a from an alternating current (AC) signal generator 15a, and a voltage $-V_1$ is applied to the bias electrode 13b from an AC signal generator 15b, as shown in FIG. 2. Moreover, a voltage $V_2$ is applied to the bias electrode 14a from an AC signal generator 16a, and a voltage $-V_2$ is applied to the bias electrode 14b from an AC signal generator 16b. The voltage $V_1$ and the voltage $V_2$ are AC signals. These AC signals are equal to each other in frequency, but they are different from each other in phase by 90 degrees. Namely, $V_1=V_{10} \sin \omega t$, and $V_2=V_{20} \cos \omega t$. The frequency of each AC signal is, for example, about 5 to 8 kHz.

By applying $V_1=V_{10} \sin \omega t$ to the bias electrode 13a and by applying $-V_1=-V_{10} \sin \omega t$ to the bias electrode 13b, a voltage between the bias electrodes 13a and 13b becomes $V_1-(-V_1)=2V_1=2V_{10} \sin \omega t$. By the application of these voltages, an electric field 17 ($E_1=E_{10} \sin \omega t$) parallel to the surface of the ferroelectric recording medium 20, i.e., parallel to the Z direction, is generated. The amplitude of the electric field 17 is determined on the basis of the voltage $2V_1$ and a distance between the bias electrodes 13a and 13b.

In the same manner, by applying $V_2=V_{20} \cos \omega t$ to the bias electrode 14a and by applying $-V_2=-V_{20} \cos \omega t$ to the bias electrode 14b, a voltage between the bias electrodes 14a and 14b becomes $V_2-(-V_2)=2V_2=2V_{20} \cos \omega t$. By the application of these voltages, an electric field 18 ($E_2=E_{20} \cos \omega t$) parallel to the surface of the ferroelectric recording medium 20, i.e., parallel to the X direction, is generated. The amplitude of the electric field 18 is determined on the basis of the voltage $2V_2$ and a distance between the bias electrodes 14a and 14b.

The phase difference between the electric field 17 ($E_1=E_{10} \sin \omega t$) and the electric field 18 ($E_2=E_{20} \cos \omega t$) is 90 degrees. Further, their directions intersect at right angles. Therefore, the rotating electric field parallel to the surface of the ferroelectric recording medium 20 is generated. Applying this rotating electric field to the surface of the ferroelectric recording medium 20 results in biasing the polarization domains formed parallel to the surface of the ferroelectric recording medium 20. When the direction of the rotating electric field coincides with the polarization direction of the polarization domain, the capacitance of the ferroelectric recording medium 20 located just under the tip of the probe 11 become at a maximum. Therefore, the polarization state of the ferroelectric recording medium 20 located just under the tip of the probe 11 can be detected.

Moreover, if a recording signal generator is connected in place of the AC signal generators 15a, 15b, 16a and 16b, and if a voltage corresponding to data to be recorded is applied between the probe 11 and any one of the bias electrodes 13a, 13b, 14a and 14b by using the recording signal generator, it is possible to form a polarization domain having a polarization direction determined from the selected bias electrode and the probe 11. The polarization domain is parallel to the surface of the ferroelectric recording medium 20, and it is determined from a combination of the probe 11 and any one of the bias electrodes 13a, 13b, 14a and 14b (i.e., a combination of the probe 11 and a selected bias electrode). Since there are four kinds of combination of the probe 11 and the bias electrode, four kinds of polarization direction can be set in the ferroelectric recording medium 20. Therefore, data having four values (four levels) can be recorded in one domain of the ferroelectric recording medium 20 by selecting any one of the four bias electrodes 13a, 13b, 14a and 14b. Consequently, multivalued recording or multilevel recording can be achieved. For example, by relating the Z axis direction to (0, 0), the X axis direction to (0, 1), the –Z axis direction to (1, 0), and the –X axis direction to (1, 1), it is possible to record 2 bit data (4 types of data) in one domain of the ferroelectric recording medium 20. Moreover, if taking such a construction that a back electrode is formed on the ferroelectric recording medium 20, as with the conventional SNDM recording/reproducing apparatus, and that an electric field in the vertical direction is applied between the probe 11 and the ferroelectric recording medium 20, it is possible to record/reproduce totally six values of data including two values of ±Y directions in addition to the above four values of ±X and ±Z directions.

FIG. 3 shows a method of detecting the polarization direction of the polarization domain. Although the bias electrodes 14a and 14b are omitted in FIG. 3, they perform in a similar way to the bias electrodes 13a and 13b. An inductor 19 having inductance L is placed between the probe 11 and the return electrode 12. A resonance circuit is constructed from this inductor 19 and a capacitance Cs. The capacitance Cs corresponds to the state of a polarization domain just under the probe 11. The inductance L of the inductor 19 is determined so that the resonance frequency f=½ oscillator 31, the inductor 19 and the capacitance Cs (about 1 GHz, for example). The electric field $E_4$ returns to the return electrode 12. The return electrode 12 is an element of the resonance circuit together with the oscillator 31, the probe 11, the inductor 19 and the capacitance Cs. In FIG. 3, the dotted line of the electric field $E_4$ shows a feedback route of the high frequency oscillation signal of the resonance circuit. By placing the return electrode 12 near the probe 11, the feedback route becomes short. Therefore, the change of the capacitance Cs can be accurately detected by using the frequency modulation system.

FIG. 4 shows the principle of the recording/reproducing with respect to the ferroelectric recording medium 20. Data is recorded in the ferroelectric recording medium 20 as the polarization directions P parallel to the surface of the ferroelectric recording medium 20. Although only the polarization directions P parallel to the Z direction are depicted in FIG. 4, the data is recorded as the polarization directions parallel to the X direction which is perpendicular to the Z direction along the surface of the ferroelectric recording medium 20. Moreover, data can be recorded as the polarization directions parallel to the Y direction which is perpendicular to the Z direction and the X direction (i.e., perpendicular to the surface of the ferroelectric recording medium 20).

When the data is recorded in the ferroelectric recording medium 20, an electric field stronger than a coercive electric field of the ferroelectric recording medium 20 is applied between the probe $\pi\sqrt{}$ (LCs) of the resonance circuit is 1 GHz, for example.

The voltages V1, −V1, V2 and −V2 are applied to the bias electrodes 13a, 13b, 14a and 14b, respectively. By the application of these voltages, the rotating electric field parallel to the surface of the ferroelectric recording medium 20 is generated in ferroelectric recording medium 20. According to the rotation of the rotating electric field, the capacitance Cs is changed. When the direction of the rotating electric field coincides with the polarization direction of the ferroelectric recording medium 20 located just under the probe 11, the capacitance Cs is at a maximum. When the direction of the rotating electric field is different from the polarization direction of the ferroelectric recording medium 20 located just under the probe 11 by 90 degrees, the capacitance Cs is at a minimum. In this condition, an oscillator 31 performs. Since the oscillation frequency of the oscillator 31 (i.e., the resonance frequency of the resonance circuit) is determined by ½ $\pi\sqrt{}$ (LCs), the oscillation frequency is changed according to the change of the capacitance Cs, Thus, the frequency modulation (FM) signal is obtained from the output of the oscillator 31. By demodulating this FM signal on the basis of the phase of the voltage $V_1$ or $V_2$, it is possible to detect the polarization direction of the polarization domain. Namely, it is possible to determine one of the four types of data according to the detected polarization direction, and it is possible to reproduce the multivalued data. In FIG. 3, an electric field $E_3$ is the electric field between the bias electrodes 13a and 13b (about 5 to 8 kHz, for example). An electric field $E_4$ is the high frequency electric field generated by the oscillation of the 11 and any one of the bias electrodes 13a, 13b, 14a and 14b. By the application of this strong electric field, the ferroelectric recording medium 20 located just under the probe 11 (the small area determined by the radius of the tip of the probe 11) is polarized according to the direction of this electric field. By selecting one of the bias electrodes 13a, 13b, 14a and 14b according to the value of the data, the direction of the electric field can be determined. Therefore, the polarization direction can be set according to the value of the data. Thus, the data is recorded in the ferroelectric recording medium 20 as the polarization direction. Since at least four polarization directions, i.e., the Z axis direction, the X axis direction, the −Z axis direction, or the −X axis direction, as shown in FIG. 2, can be select and set in each domain, the multivalued recording can be achieved.

Reproduction is performed by detecting the capacitance Cs corresponding to the polarization state; namely, by detecting the changes in oscillation frequency corresponding to the changes of the capacitance Cs as described above. The return electrode 12 is an electrode for returning the electric field of a high-frequency component applied from the probe 11 to the ferroelectric recording medium 20 and is placed to surround the probe 11.

(Embodiment of Dielectric Reproducing Apparatus)

Figure 5:
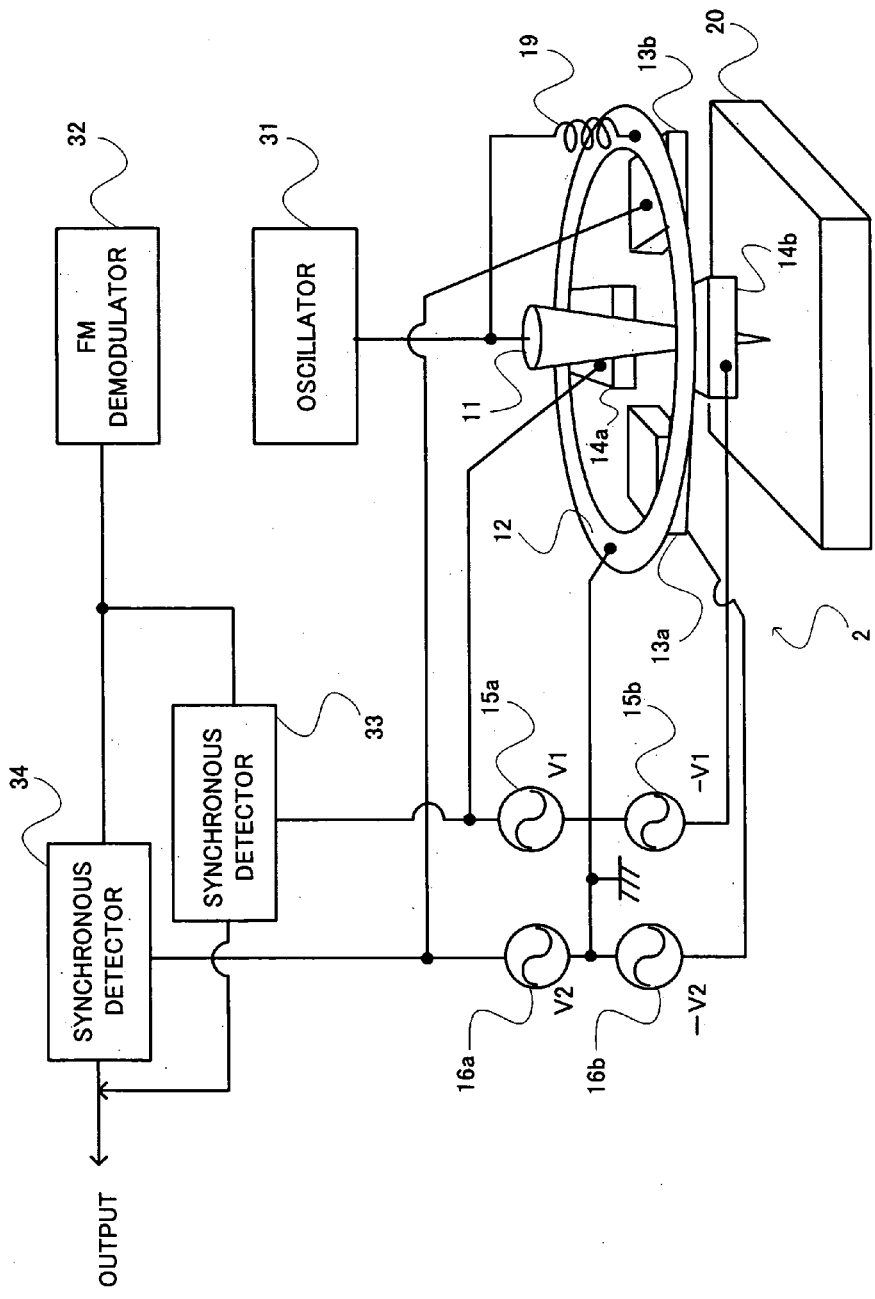
FIG. 5 is a schematic diagram showing an embodiment of a dielectric reproducing apparatus associated with the present invention.

An embodiment of a dielectric reproducing apparatus associated with the present invention will be explained with reference to FIG. 5. As shown in FIG. 5, a dielectric reproducing apparatus 2 includes a dielectric recording/reproducing head 1, which is provided with: the probe 11 for searching polarization domains of the ferroelectric recording medium 20; the return electrode 12 for returning an electric field of a high frequency component which is applied to the probe 11; and the bias electrodes 13a, 13b, 14a, and 14b for applying the rotating electric field to the ferroelectric recording medium 20. The dielectric reproducing apparatus 2 is also provided with: the inductor 19, which is placed between the probe 11 and the return electrode 12; the oscillator 31, which oscillates at the resonance frequency determined from the inductor 19 and from the capacitance Cs of a polarization domain which is formed in the ferroelectric recording medium 20 just under the probe 11 and which corresponds to recorded information; AC signal generators 15a, 15b, 16a, and 16b for generating AC signals which are applied to the bias electrodes 13a, 13b, 14a, and 14b, respectively; a frequency modulation (FM) demodulator 32 for demodulating a FM signal modulated by the capacitance Cs corresponding to the polarization domain owned by the ferroelectric recording medium 20 just under the probe 11; and synchronous detectors 33 and 34 for reproducing data from the demodulated signal.

The probe 11 touches the ferroelectric recording medium 20, or faces to it with a small space. Corresponding to the radius of the tip of the probe 11, each of the polarization domains corresponding to data is formed in the ferroelectric recording medium 20. In reproducing, the capacitance Cs, which corresponds to the polarization in the ferroelectric recording medium 20 under the tip of the probe 11, participates in the resonance circuit made with the inductor 19, so that the oscillation frequency comes to depend on the capacitance Cs. By demodulating an oscillation signal which is frequency-modulated on the basis of this capacitance Cs, a detection voltage shown in FIG. 4 is outputted, and the recorded data is reproduced.

The AC signal generators 15a, 15b, 16a and 16b generate AC signals which are applied to the bias electrodes 13a, 13b, 14a and 14b. These AC signals form the rotating electric field parallel to the surface of the ferroelectric recording medium 20 on the surface, as explained with reference to FIG. 2. The maximum value of the capacitance Cs is detected when the direction of this rotating electric field coincides with the polarization direction of the polarization domain. Incidentally, these AC signals are used for a reference signal when reproducing data by coherent detection from the frequency-demodulated signal. These AC signals have frequencies of 5 to 8 KHz, for example, but high-frequency is desired for a data transfer rate.

The inductor 19 is placed between the probe 11 and the return electrode 12, and may be formed as a microstripline, for example. The inductance L of the inductor 19 and the capacitance Cs constitute the resonance circuit. The inductance L of the inductor 19 is determined so that this resonance frequency, $f=1/2 \pi \sqrt{(LCs)}$, is about 1 GHz, for example.

As the ferroelectric recording medium 20, $LiTaO_3$, PZT, or the like, which is a ferroelectric substrate, is preferably used. As the shape of the ferroelectric recording medium 20, there are a disk form, a card form, or the like. The relative position movement to the probe 11 is performed by the rotation of the medium or by the linear movement of either the probe 11 or the medium.

The oscillator 31 oscillates at a frequency determined from the inductance L and the capacitance Cs. Its oscillation frequency changes correspondingly to the changes of the capacitance Cs, so that it is frequency-modulated correspondingly to the changes of the capacitance Cs which is determined from the polarization direction of the polarization domain corresponding to recorded data. By demodulating this FM signal, it is possible to read the recorded data.

The FM demodulator 32 demodulates the oscillation frequency of the oscillator 31 modulated by the capacitance Cs, and reconstructs a waveform corresponding to the polarized state of a potion on which the probe 11 traces. Namely, the FM demodulator 32 demodulates the frequency modulated correspondingly to the recorded data.

The synchronous detectors 33 and 34 reproduce the recorded data on the basis of the signal demodulated by the FM demodulator 32 and the AC signals applied from the AC signal generators 15a and 16a. The signal demodulated by the FM demodulation corresponds to the polarization directions of the four polarization domains recorded in the ferroelectric recording medium 20. The polarization directions are detected by the AC signals for reference, and the multivalued data is reproduced. Incidentally, a lock-in amplifier or the like is preferably used as the synchronous detector.

As explained above, according to the dielectric reproducing apparatus in the embodiment, it is possible to detect the polarization directions of the polarization domains which are formed on the surface of the ferroelectric recording medium and which are parallel to the surface. Therefore, it is possible to reproduce the multivalued data recorded correspondingly to the polarization direction.

(Embodiment of Dielectric Recording Apparatus)

Figure 6:
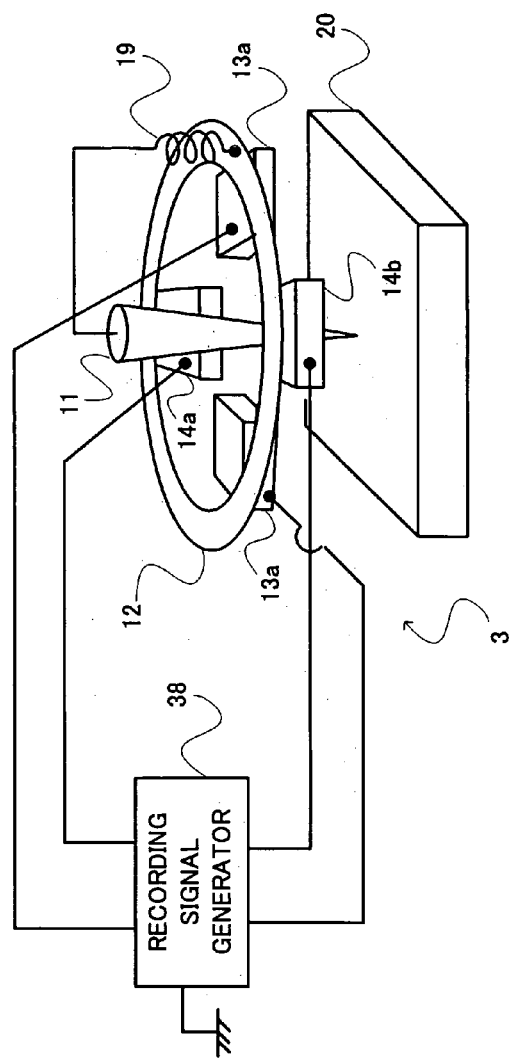
FIG. 6 is a schematic diagram showing an embodiment of a dielectric recording apparatus associated with the present invention.

An example of the dielectric recording apparatus associated with the present invention will be explained with reference to FIG. 6. As shown in FIG. 6, a dielectric recording apparatus 3 includes the dielectric recording/reproducing head 1, which is provided with: the probe 11 for searching polarization domains of the ferroelectric recording medium 20; the return electrode 12 for returning an electric field of a high frequency component which is applied to the probe 11; and the bias electrodes 13a, 13b, 14a, and 14b for applying to the ferroelectric recording medium 20 a voltage for the formation of the polarization domains corresponding to data. The dielectric recording apparatus 3 is further provided with a recording signal generator 38 for forming data which is recorded, or the like.

The probe 11 touches the ferroelectric recording medium 20, or faces to it with a small space. By applying a voltage between the probe 11 and any one of the bias electrodes 13a, 13b, 14a, and 14b, an electric field is generated in the direction connecting the bias electrode and the probe 11. The polarization domain is formed parallel to the surface of the ferroelectric recording medium 20 along the electric field.

The recording signal generator 38 generates data which is to be applied to the bias electrodes 13a, 13b, 14a, and 14b, and supplies it to the respective bias electrodes according to the value of the data to be recorded. The generated data is converted with a predetermined recording format, and it may include control information, error correction, compressed data or the like.

In order to generate an electric field corresponding to data, voltages are supplied to the bias electrodes 13a, 13b, 14a and 14b from the recording signal generator 38. For example, in order to generate an electric field in the +Z axis direction, a positive voltage is supplied to the bias electrode 13b and a negative voltage is supplied to the bias electrode 13a. By the electric field generated between the probe 11 and the bias electrodes 13a and 13b, a polarization domain whose polarization direction is the +Z axis direction is formed parallel to the surface of the ferroelectric recording medium 20. The same is true in the −Z axis direction, in the +X axis direction, and in the −X axis direction. Incidentally, the voltages which are applied generate an electric field stronger than the coercive electric field of the ferroelectric recording medium 20.

As described above, the dielectric recording apparatus 3 can form a polarization domain which has one out of four directions on a predetermined site of the ferroelectric recording medium 20, allowing the multivalued recording. Namely, if letting the Z axis direction be (0, 0), the X axis direction be (0, 1), the −Z axis direction be (1, 0), and the −X axis direction be (1, 1), it is possible to record 2 bit information correspondingly to the directions of the polarization domains.

(Embodiment of Dielectric Recording/Reproducing Apparatus)

Figure 7:
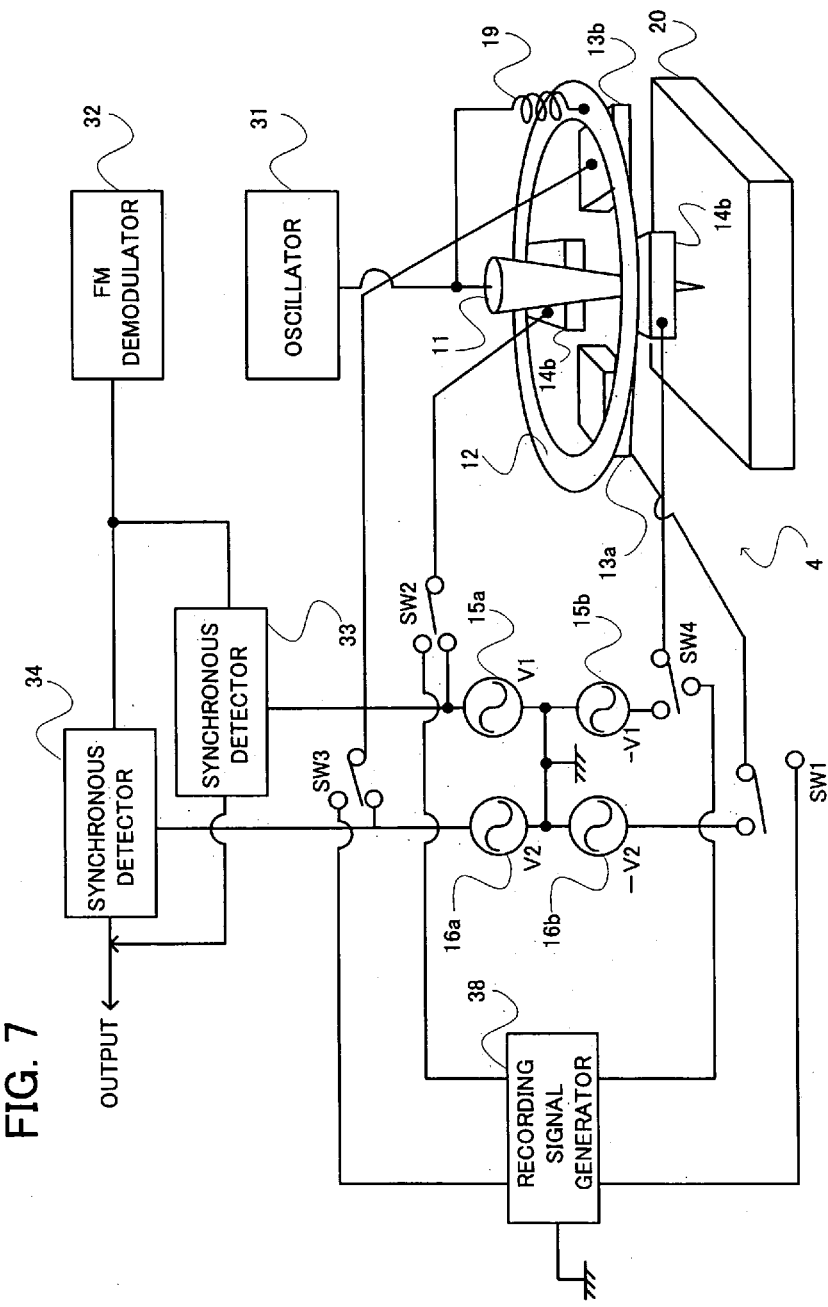
FIG. 7 is a schematic diagram showing an embodiment of a dielectric recording/reproducing apparatus associated with the present invention.

An embodiment of a dielectric recording/reproducing apparatus associated with the present invention will be explained with reference to FIG. 7. As shown in FIG. 7, as a recording system, a dielectric recording/reproducing apparatus 4 includes the dielectric recording/reproducing head 1, which is provided with: the probe 11 for searching polarization domains of the ferroelectric recording medium 20; the return electrode 12 for returning an electric field of a high frequency component which is applied to the probe 11; and the bias electrodes 13a, 13b, 14a and 14b for applying the rotating electric field to the ferroelectric recording medium 20. The dielectric recording/reproducing apparatus 4 is further provided with the recording signal generator 38 for forming data which is recorded, or the like. As a reproducing system, in addition to the above-described dielectric recording/reproducing head 1, the dielectric recording/reproducing apparatus 4 is also provided with: the inductor 19, which is placed between the probe 11 and the return electrode 12; the oscillator 31, which oscillates at the resonance frequency determined from the inductor 19 and from the capacitance Cs of a polarization domain which is formed in the ferroelectric recording medium 20 just under the probe 11 and which corresponds to recorded information; the AC signal generators 15a, 15b, 16a and 16b for generating AC signals which are applied to the bias electrodes 13a, 13b, 14a and 14b, respectively; the FM demodulator 32 for demodulating an FM signal modulated by the capacitance corresponding to the polarization domain owned by the ferroelectric recording medium 20 just under the probe 11; and the synchronous detectors 33 and 34 for reproducing data from the demodulated signal. Furthermore, the dielectric recording/reproducing apparatus 4 is provided with switches SW1, SW2, SW3, SW4 or the like for switching the voltages which are applied to the bias electrodes when recording and reproducing.

The switches SW1 to SW4 are switched together when recording and reproducing. For example, the switch SW1 is switched so that a signal from the recording signal generator 38 is applied to the bias electrode 13a when recording and that a signal from the AC signal generator 15a is applied to the bias electrode 13a when reproducing. By this switching, a voltage based on recording data is applied to the bias electrode 13a when recording, and polarization domain is formed in the direction of the probe 11 and the bias electrode 13a. A voltage based on an AC signal is applied to the bias electrode 13a when reproducing, and the directions of the formed polarization domains are detected. The same is true for the switches SW2, SW3 and SW4.

Incidentally, the operations and functions of other constitutional elements are the same as those explained in the dielectric reproducing apparatus 2 and the dielectric recording apparatus 3, and another explanation here is omitted.

Figure 8:
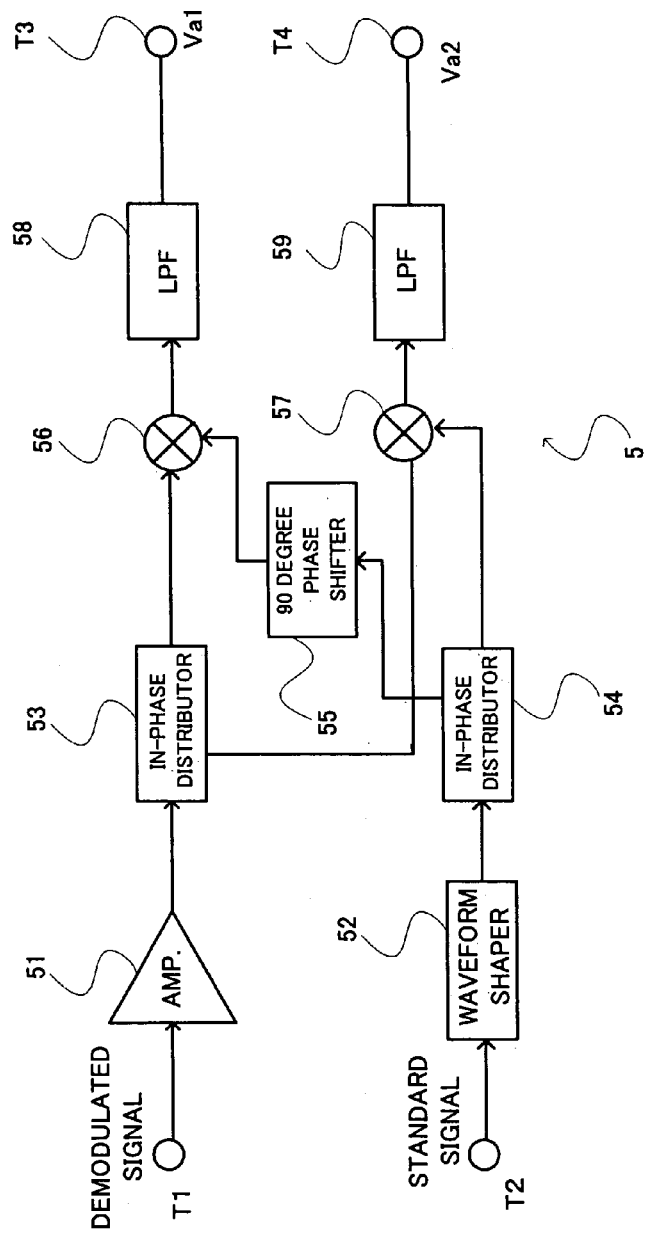
FIG. 8 is a schematic diagram showing a construction of a lock-in amplifier, which is a synchronous detector.

Next, with reference to FIG. 8, the lock-in amplifier will be explained as one example of the synchronous detector used for coherent detection. As shown in FIG. 8, a lock-in amplifier 5 is provided with: input terminals T1 and T2; an amplifier 51; a waveform shaper 52; in-phase distributors 53 and 54; a 90 degree phase shifter 55; mixers 56 and 57, which are multipliers; low-pass filters 58 and 59; and output terminals T3 and T4.

The amplifier 51 amplifies a demodulated signal inputted through the input terminal T1 and outputs it to the in-phase distributor 53. The in-phase distributor 53 distributes the amplified demodulated signal at in-phase and outputs it to the mixers 56 and 57. In the meanwhile, the waveform shaper 52 shapes a standard signal inputted through the input terminal T2 to a square wave and outputs it to the in-phase distributor 54. The in-phase distributor 54 distributes at in-phase the standard signal outputted from the waveform shaper 52 and outputs it to the mixer 57 and the 90 degree phase shifter 55. The 90 degree phase shifter 55 shifts the phase of the standard signal at a phase shift of only 90 degrees in the frequency of the standard signal and outputs it to the mixer 56. The mixer 56 multiplies and mixes the demodulated signal and the standard signal phase-shifted only at 90 degrees, converts them to a signal having frequencies of the sum and difference between the frequency of the demodulated signal and the frequency of the standard signal, and outputs it to the low-pass filter 58. The low-pass filter 58 allows the passing of only a direct current (DC) signal out of inputting signals after the mixing and outputs an output voltage Va1 to the output terminal T3. The mixer 57 multiplies and mixes the standard signal and the demodulated signal, converts them to a signal having frequencies of the sum and difference between the frequency of the demodulated signal and the frequency of the standard signal, and outputs it to the low-pass filter 59. The low-pass filter 59 allows the passing of only a DC signal out of inputting signals after the mixing and outputs an output voltage Va2 to the output terminal T4.

Signals picked-up by the circuit having such a function are reproduced by using the AC signals from the AC signal generators 15a and 16a as coherent signals, so that recorded information is reproduced. Incidentally, the device used for the coherent detection is not limited to the lock-in amplifier having this construction, and other synchronous detection devices may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-346109 filed on Nov. 28, 2002 including the specification, claims, drawings and summary is incorporated herein by reference in its entirety.

What is claimed is:

1. A dielectric reproducing head for reproducing data recorded in a dielectric recording medium, comprising;
    a probe for applying a high-frequency signal to the dielectric recording medium to detect a nonlinear dielectric constant of a part of the dielectric recording medium located under the probe;
    a plurality of bias electrodes placed around the probe, for forming an electric field parallel to a surface of the dielectric recording medium; and
    a return electrode for returning the high-frequency signal.

2. The dielectric reproducing head according to claim 1, wherein the plurality of bias electrodes make a plurality of bias electrode pairs, two bias electrodes in each of the bias electrode pairs are placed on both sides of the probe respectively, and the probe and the two bias electrodes in each of the bias electrode pairs are arranged in a straight line.

3. The dielectric reproducing head according to claim 2, wherein four of the plurality of bias electrodes are placed around the probe at intervals of an angle of 90 degrees.

4. The dielectric reproducing head according to claim 2, further comprising an alternating current voltage generation device for generating a plurality of alternating current voltages each having different phase from the others, and applying the plurality of alternating current voltages to the plurality of bias electrode pairs respectively.

5. The dielectric reproducing head according to claim 3, further comprising an alternating current voltage generation device for generating a plurality of alternating current voltages which are different in phase from each other by 90 degrees, and applying the plurality of alternating current voltages to the plurality of bias electrode pairs respectively.

6. The dielectric reproducing head according to claim 1, wherein the probe detects the nonlinear dielectric constant of a part of the dielectric recording medium located under the probe by using a scanning nonlinear dielectric microscopy method.

7. A dielectric recording head for recording data in a dielectric recording medium, comprising:
   a probe; and
   a plurality of bias electrodes placed around the probe, for forming an electric field parallel to a surface of the dielectric recording medium by generating a voltage corresponding to the data between any one of the plurality of bias electrode and the probe.

8. The dielectric recording head according to claim 7, wherein the plurality of bias electrodes make a plurality of bias electrode pairs, two bias electrodes in each of the bias electrode pairs are placed on both sides of the probe respectively, and the probe and the two bias electrodes in each of the bias electrode pairs are arranged in a straight line.

9. The dielectric recording head according to claim 8, wherein four of the plurality of bias electrodes are placed around the probe at intervals of an angle of 90 degrees.

10. A dielectric reproducing apparatus for reproducing data recorded in a dielectric recording medium, comprising:
   a dielectric reproducing head comprising (i) a probe for applying a high-frequency signal to the dielectric recording medium to detect a nonlinear dielectric constant of a part of the dielectric recording medium located under the probe, (ii) a plurality of bias electrodes placed around the probe, for forming an electric field parallel to a surface of the dielectric recording medium, and (iii) a return electrode for returning the high-frequency signal;
   an alternating current signal generating device for generating an alternating current signal to be applied to the plurality of bias electrodes of the dielectric reproducing head to form the electric field;
   an oscillating device for generating the high-frequency signal to be applied to the probe;
   a demodulating device for demodulating the high-frequency signal including a signal component corresponding to the nonlinear dielectric constant detected by the probe; and
   a data reproducing device for reproducing the data on the basis of the demodulated high-frequency signal and the alternating current signal.

11. The dielectric reproducing apparatus according to claim 10, wherein the data reproducing device reproduces the data by using coherent detection.

12. The dielectric reproducing apparatus according to claim 11, wherein the data reproducing device is a lock-in amplifier.

13. A dielectric recording apparatus for recording data in a dielectric recording medium, comprising:
   a dielectric recording head comprising (i) a probe and (ii) a plurality of bias electrodes placed around the probe, for forming an electric field corresponding to the data parallel to a surface of the dielectric recording medium;
   a recording signal generating device for generating a recording signal corresponding to the data; and
   a signal applying device for applying the recording signal between the probe and any one of the plurality of bias electrodes to form the electric field corresponding to the data.

14. A dielectric recording/reproducing apparatus for recording data in a dielectric recording medium and for reproducing data recorded in the dielectric recording medium, comprising:
   a dielectric recording/reproducing head comprising (i) a probe, (ii) a plurality of bias electrodes placed around probe, (iii) a return electrode placed near the probe,
   an oscillating device for generating a high-frequency signal to be applied between the probe and the return electrode, in order to detect a nonlinear dielectric constant of a part of the dielectric recording medium located under the probe through the probe;
   an alternating current signal generating device for generating an alternating current signal to be applied to the plurality of bias electrodes, in order to form an electric field in the dielectric recording medium;
   a demodulating device for demodulating the high-frequency signal including a signal component corresponding to the nonlinear dielectric constant of a part of the dielectric recording medium located under the probe;
   a data reproducing device for reproducing the data on the basis of the demodulated high-frequency signal and the alternating current signal;
   a recording signal generating device for generating a recording signal corresponding to the data to be recorded; and
   a signal applying device for applying the recording signal between the probe and any one of the plurality of bias electrodes.

15. The dielectric recording/reproducing apparatus according to claim 14, wherein the data reproducing device reproduces the data by using coherent detection.

16. The dielectric recording/reproducing apparatus according to claim 15, wherein the data reproducing device is a lock-in amplifier.

* * * * *